(12) United States Patent
Dielacher et al.

(10) Patent No.: US 9,922,427 B2
(45) Date of Patent: Mar. 20, 2018

(54) TIME-OF-FLIGHT CAMERA WITH LOCATION SENSOR SYSTEM

(71) Applicant: Infineon Technologies AG, Neubiberg (DE)

(72) Inventors: Markus Dielacher, Graz (AT); Josef Prainsack, Graz (AT); Martin Flatscher, Graz (AT); Michael Mark, Graz (AT)

(73) Assignee: Infineon Technologies AG, Neubiberg (DE)

( * ) Notice: Subject to any disclaimer, the term of this patent is extended or adjusted under 35 U.S.C. 154(b) by 315 days.

(21) Appl. No.: 14/297,999

(22) Filed: Jun. 6, 2014

(65) Prior Publication Data
US 2015/0356747 A1    Dec. 10, 2015

(51) Int. Cl.
*G01S 7/497* (2006.01)
*G06T 7/20* (2017.01)
(Continued)

(52) U.S. Cl.
CPC ........... *G06T 7/2086* (2013.01); *G01S 7/497* (2013.01); *G01S 17/023* (2013.01); *G01S 17/36* (2013.01);
(Continued)

(58) Field of Classification Search
CPC .................. G06T 7/2086; G06T 7/004; G06T 2207/10032; G06T 2207/10052;
(Continued)

(56) References Cited

U.S. PATENT DOCUMENTS

2012/0098935 A1    4/2012  Schmidt et al.
2012/0155775 A1*   6/2012  Ahn ..................... G06T 7/0042
                                                        382/195
(Continued)

FOREIGN PATENT DOCUMENTS

CN            103181156 A       6/2013

OTHER PUBLICATIONS

Hakansson, Mikael. "Inertial Measurement Unit Application for Time of Flight Cameras." Master's Thesis Lulea University of Technology. Apr. 24, 2011.

*Primary Examiner* — William C Vaughn, Jr.
*Assistant Examiner* — Jae N Noh
(74) *Attorney, Agent, or Firm* — Eschweiler & Potashnik, LLC

(57) ABSTRACT

A time-of-flight (TOF) camera system includes a radiation source, a radiation detector, a location sensor system and a processor. The radiation source is configured to generate and emit a radiation that strikes a target object. The radiation detector is configured to detect the radiation reflected from the target object and generate a sample set comprising at least two raw samples detected in succession at different times based on the reflected radiation. The location sensor system is configured to detect movements of the TOF camera during the detection and generate a movement signal having portions thereof uniquely corresponding to each of the raw samples of the sample set based on the movements of the TOF camera, wherein a portion of the movement signal is detected at a same time of generating the corresponding raw sample. The processor is configured to receive the raw samples and the corresponding movement signal portions and generate an object information based on the raw samples and the corresponding movement signal portion.

17 Claims, 5 Drawing Sheets

(51) Int. Cl.
   *G06T 7/00*      (2017.01)
   *H04N 7/18*      (2006.01)
   *G01S 17/89*     (2006.01)
   *G01S 17/02*     (2006.01)
   *G01S 17/36*     (2006.01)
   *G01C 11/08*     (2006.01)

(52) U.S. Cl.
   CPC ............ *G01S 17/89* (2013.01); *G06T 7/004* (2013.01); *H04N 7/183* (2013.01); *G01C 11/08* (2013.01); *G06T 2207/10032* (2013.01); *G06T 2207/10052* (2013.01); *G06T 2207/30241* (2013.01)

(58) Field of Classification Search
   CPC ........... G06T 2207/30241; G01S 7/497; G01S 17/023; G01S 17/36; G01S 17/89; H04N 7/183; G01C 11/08
   USPC .......................................................... 348/142
   See application file for complete search history.

(56) References Cited

U.S. PATENT DOCUMENTS

| | | | |
|---|---|---|---|
| 2012/0176476 A1 | 7/2012 | Schmidt et al. | |
| 2013/0177236 A1* | 7/2013 | Kim ................... | G06K 9/00201 382/154 |
| 2013/0242111 A1* | 9/2013 | Lee ........................ | G01S 17/89 348/164 |
| 2016/0069985 A1* | 3/2016 | Kwakkernaat ............ | G01S 1/06 342/146 |

* cited by examiner

| Raw sample | i(j-1)-A | 11-B | ... | X₁X₂ |
|---|---|---|---|---|
| Move-ment | Δ-A | Δ-B | ... | Δ-X |

US 9,922,427 B2

TIME-OF-FLIGHT CAMERA WITH LOCATION SENSOR SYSTEM

FIELD

The present disclosure is in the field of three-dimensional cameras, particularly, a time of flight camera and a location sensor system associated therewith.

BACKGROUND

A time-of-flight (TOF) camera is a compact sensor that provides depth and reflectance measurements at a relative high frame rate. By processing the measured depth and reflectance information for sufficient pixels of a target object, a three-dimensional (3D) image of the target object is acquired.

Relative movements between the camera and the target object affect the quality of the acquired 3D image of the target object. The pixels are mixed up due to the relative movements. Further, the relative movements affect, and sometimes invalidate the measured depth and reflectance information of a single pixel of the target object. This is because, for the TOF camera, the depth and reflectance information of a single pixel are usually acquired by processing a few raw samples taken in succession at different times.

DETAILED DESCRIPTION

Figure 1:
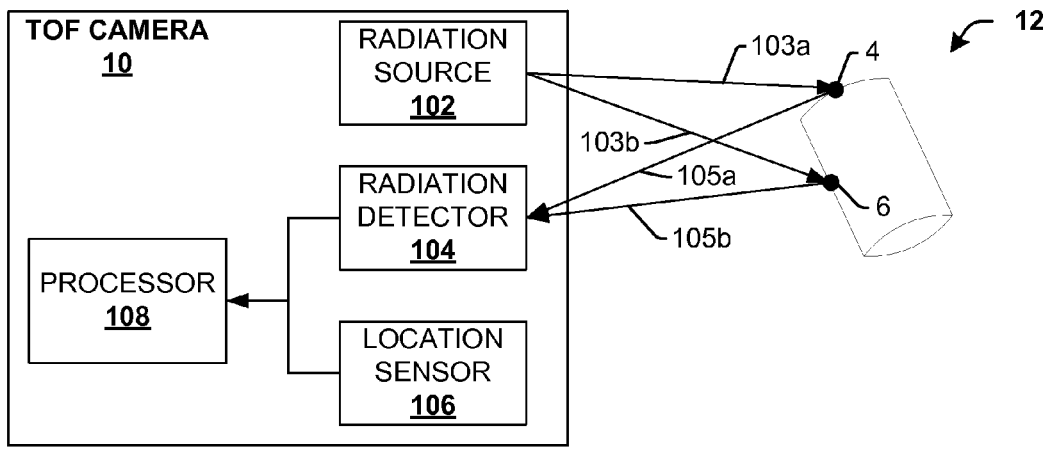
FIG. 1 is a block diagram illustrating a 3D imaging system with a time-of-flight (TOF) camera and a target object.

The present disclosure will now be described with reference to the attached drawing figures, wherein like reference numerals are used to refer to like elements throughout, and wherein the illustrated structures and devices are not necessarily drawn to scale.

Systems and methods are disclosed that incorporate a location sensor system into a time-of-flight (TOF) camera. A TOF camera detects a time needed for an emitted radiation from a radiation source (that, in one embodiment, is a part of the TOF camera) to strike a target object and be reflected back to the radiation source from the target object. A distance between the source and the target object is then calculated through the detected time and the known speed of the radiation. In some embodiments, the emitted radiation can be a modulated continuous periodical electromagnetic wave. The time is acquired by comparing phase shifts between more than one sample of reflected radiation detected in succession at different times and the possible modulated emitted radiation. If the TOF camera moves during the detections of the reflected radiations, the detected phase shifts are not for a same corresponding distance and cannot be processed correctly. The location sensor system detects a movement signal having portions corresponding to relative movements of the TOF camera for each detected sample of reflected radiation. If a portion of the movement signal exceeds a pre-determined threshold value, the corresponding phase shift data can be discarded.

In some embodiments, the corresponding phase shift data is a raw frame comprising a pixel array corresponding to different portions of the target object. In this case, a further processing step may be applied to compare the raw frame with one or more raw frames taken at different times to keep some overlapped raw samples while discarding some other raw samples.

FIG. 1 a block diagram illustrating a three-dimensional (3D) imaging system with a time-of-flight (TOF) camera system 10 and a target object 12. The TOF camera comprises a radiation source 102, a radiation detector 104, a location sensor system 106 and a processor 108. The radiation source 102 is configured to generate and emit a radiation 103 that strikes the target object 12. The radiation 103 reaches the target object 12 and is then reflected to the radiation detector 104. The radiation detector 104 is configured to detect the reflected radiation 105 and generate a sample set having some raw samples generated in succession at different times based on the reflected radiation 105. The location sensor system 106 is configured to detect movements of the TOF camera 10 and generate a movement signal corresponding to the detected movements. Each portion of the movement signal can be detected at a same time of detecting a corresponding raw sample of the sample set. The processor 108 is configured to receive the sample set and the corresponding movement signal. The processor 108 is further configured to select at least two raw samples from the sample set based on the corresponding portions of the movement signal. An object information is then generated based on the selected raw samples.

Figure 2:
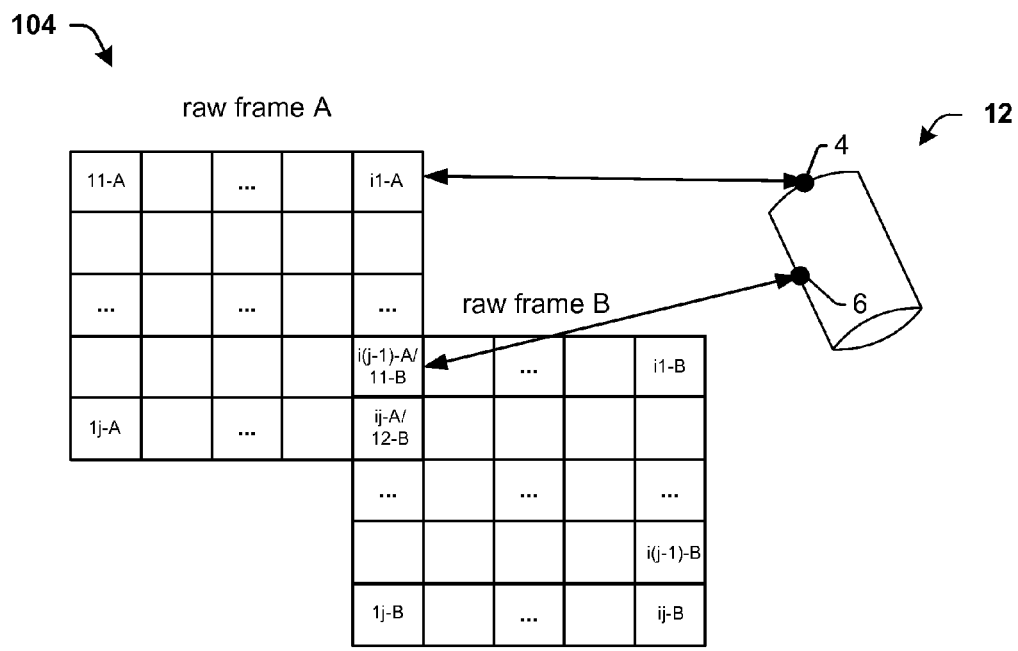
FIG. 2 is a diagram illustrating a radiation detector of the TOF camera with a pixel array.

In some embodiments, as shown in FIG. 2, the radiation detector 104 of the TOF camera comprises a pixel array having a plurality of pixels detecting different portions of the target object 12. For example, in FIG. 2, the pixel array comprises a number of i×j pixels. For illustration purposes, in a raw frame A, a first raw sample "i1-A" from a first pixel 1i corresponds to a portion 4 of the target object 12 and a second raw sample "i(j−1)-A" from a second pixel i(j−1) corresponds to another portion 6 of the target object 12. Each time the radiation detector 104 detects a raw frame (for example, raw frame A or raw frame B) having raw samples (for example, 11-A to ij-A or 11-B to ij-B) for each pixel. A frame set comprises a plurality of sample sets corresponding to different portions of the target object 12 and each sample set comprises a plurality of raw samples taken at different times.

Figures 3A, 3B:
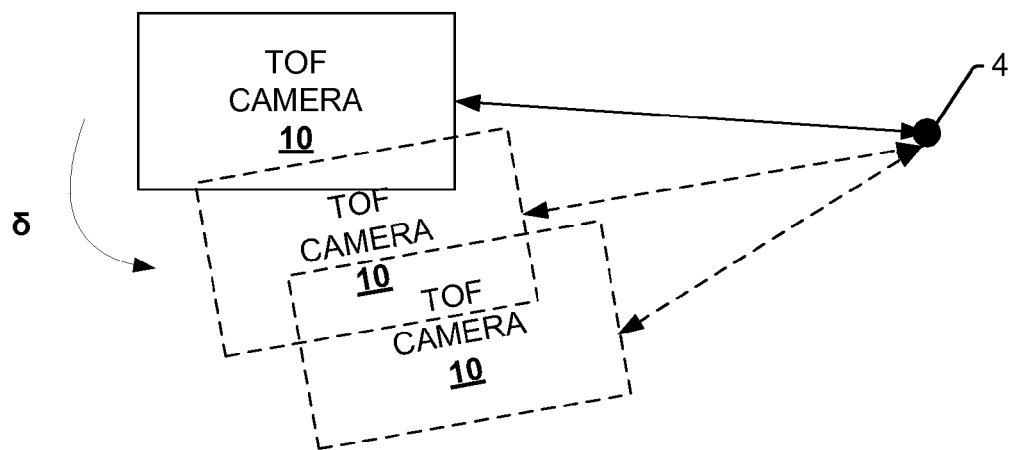
FIG. 3A is a diagram illustrating movements of the TOF camera while measuring a target object according to some embodiments.
FIG. 3B is a block diagram illustrating some raw samples and movements signal acquired by a single pixel according to some embodiments.

The location sensor system 106 detects movement signal portions at the same of the radiation detector 104 detects a sample set of raw samples in succession. Each movement signal portion represents a relative movement of the TOF camera when detecting a raw sample. FIG. 3a and FIG. 3b show an example process of detecting some raw samples and the corresponding movement signal portions. A first raw sample i(j−1)-A and a first movement signal portion Δ-A are detected at a substantially same time. With a time interval, a second raw sample 11-B and a second movement signal portion Δ-B are then detected at another substantially same time. If the TOF camera 10 is removed too far away from a reference position when detecting a raw sample, a corresponding movement signal portion will exceed a pre-determined threshold. Then the raw sample may be discarded.

Notably, in some embodiments, raw samples from different pixels of the pixel array may correspond to a same portion of the target object for different raw frames due to a relative movement between the TOF camera and the target object. For example, in FIG. 2, a raw sample "i(j−1)-A" from pixel i(j−1) of raw frame A and another raw sample "11-B" from pixel 11 of raw frame B correspond to a same portion 6 of the target object 12. In some embodiments, even if the corresponding movements signal portions of some raw frames exceed the pre-determined threshold value, the processor 108 can further evaluates some raw samples of different raw frames correspond to a same portion of the target object. For example, in FIG. 2, the raw sample "i(j−1)-A" of the raw frame A and the raw sample "11-B" of the raw frame B correspond to the same portion 6 of the target object 12. Though the TOF camera 10 is removed that the corresponding movement signal portion of the raw frame B may exceed the pre-determined threshold value, the raw sample "11-B" substantially is captured at a same location with the raw sample "i(j−1)-A" and can be kept to process the portion 6 of the target object 12. The processor 108 may keep some raw samples such as "i(j−1)-A" and "11-B" from the different raw frames that overlap while discarding the remaining raw samples that do not overlap. This approach saves more raw samples while complicating the TOF camera system processing, as a trade-off.

In some other embodiments, the radiation detector 104 can comprise only one single pixel. For example, the TOF camera 10 can be utilized to measure a distance to a target object with the single pixel. A sample set comprising a plurality of raw samples is generated in succession at different times based on a reflected radiation. The raw samples are selected based on corresponding portions of a movement signal. Only raw samples having the corresponding movement signal portions within a pre-determined threshold value are kept. Two or more raw samples are needed to process a measured distance information. If a required number of valid raw samples cannot be acquired, no valid distance measurement can be generated.

Figure 6A:
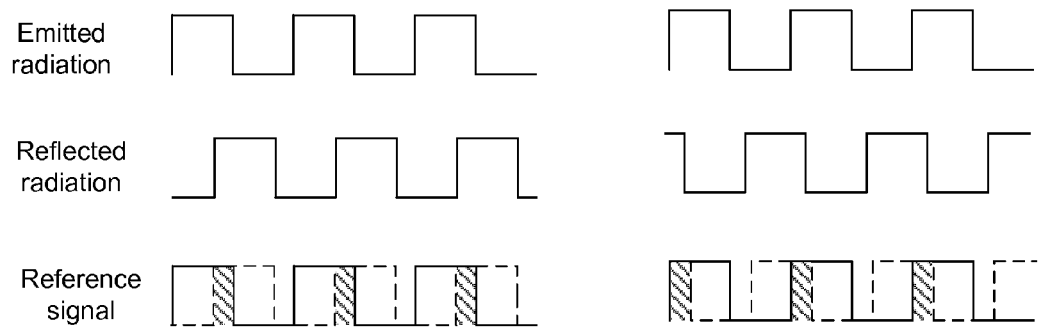
FIGS. 6A and 6B show a signal processing mechanism for a TOF camera according to some embodiments.
Figure 6B:
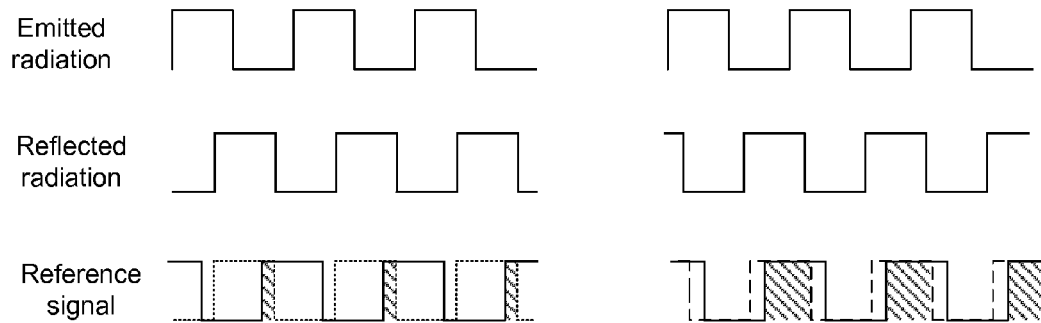

The object information may include, but is not limited to distance and reflection intensity information. In some embodiments, the object information can be generated by processing a phase shift of the reflected radiation relative to the emitted radiation from the radiation source. The emitted radiation is represented by a reference signal. The reference signal has a set of various controllable delays with respect to the emitted radiation. FIGS. 6a and 6b show a signal processing mechanism why the reference signal with at least two different delays are needed for valid processing.

FIG. 6a shows a reference signal (solid line) synchronized with the emitted radiation (with no delays). Left and right show two reflected radiations with different phase shifts to the emitted radiation representing different distances to be measured. For illustration purposes, the reflected radiations are also shown transposed onto the corresponding reference signals by dotted lines. The phase shift between the reflected radiations and the emitted radiation can be measured by a resulting voltage difference. The voltage difference is represented by a shaded area and is proportional to the phase shift. As shown in FIG. 6a, measured voltage differences of the left and right cases are the same while the two reflected radiations have different phase shifts, i.e., different distance. To address this issue, another sample needs to be processed with a reference signal having a pre-set delay with respect to the emitted radiation. For example, in FIG. 6b, a reference signal having a 90 degree delay with respect to the emitted radiation is applied to measure voltage differences of the left and right cases. By applying measurements like FIG. 6a and FIG. 6b utilizing two selected raw samples, a distance information is generated.

In some embodiments, the object information is acquired by processing correlation functions of the reflected radiation and the emitted radiation from at least four raw samples. The emitted radiation is represented by the reference signals having a set of controllable delays with respect to the emitted radiation.

For example, a correlation function for the reference signal and a sinusoidal modulated radiation source can be derived as:

$$I = M + A\cos(\theta + \varphi);$$

wherein M is the intensity of background radiation which is usually a constant non-modulated radiation; A is the intensity of the reflected radiation; $\theta$ is the delay of the reference signal and $\varphi$ is the measured phase shift. M, A and $\varphi$ are unknown in the correlation function. For computation convenience and noise performance, four raw samples with the corresponding movement signal portions within a pre-determined threshold value are commonly selected from the sample set to calculate the unknowns. By applying delays $\theta = \{0°, 90°, 180°, 270°\}$, four samples of the correlation function $I_1, I_2, I_3, I_4$ can be determined. The unknowns can be processed as:

$$M = \frac{I_1 + I_2 + I_3 + I_4}{4};$$

$$A = \frac{\sqrt{(I_4 - I_2)^2 + (I_3 - I_1)^2}}{2}; \text{ and}$$

$$\varphi = \arctan\left(\frac{I_4 - I_2}{I_3 - I_1}\right).$$

The distance z can be derived as:

$$z = \frac{tc}{2} = \frac{\varphi c}{4\pi\mu};$$

wherein t is the time the radiation travels; c is the speed of the radiation and $\mu$ is the modulation frequency of the emitted radiation. After the object information of the different portion of the target object is processed individually as shown above, a 3D image of the target object can be generated.

The radiation source can be a visible spectrum, ultraviolet, infrared, x-ray, terahertz, microwave or radio radiation among other electromagnetic waves. In some embodiments, the emitted radiation can be modulated. Such radiation can be a continuous wave, for example, a sinusoidal modulated wave, or the radiation can be switched off during an interval of the detection.

The location sensor system 106 of FIG. 1 can comprise an accelerometer, gyroscope, inclinometer, magnetometer, electronic compass, Global Position System (GPS) or combinations thereof. The movements of the TOF camera can comprise a location change or a rotation of the camera.

The radiation detector 104 can comprise a Photon Mixing Device (PMD) with two complimentary receptors. One receptor collects charges when the radiation is active and another receptor collects charges when the radiation is deactivated.

Figure 4:
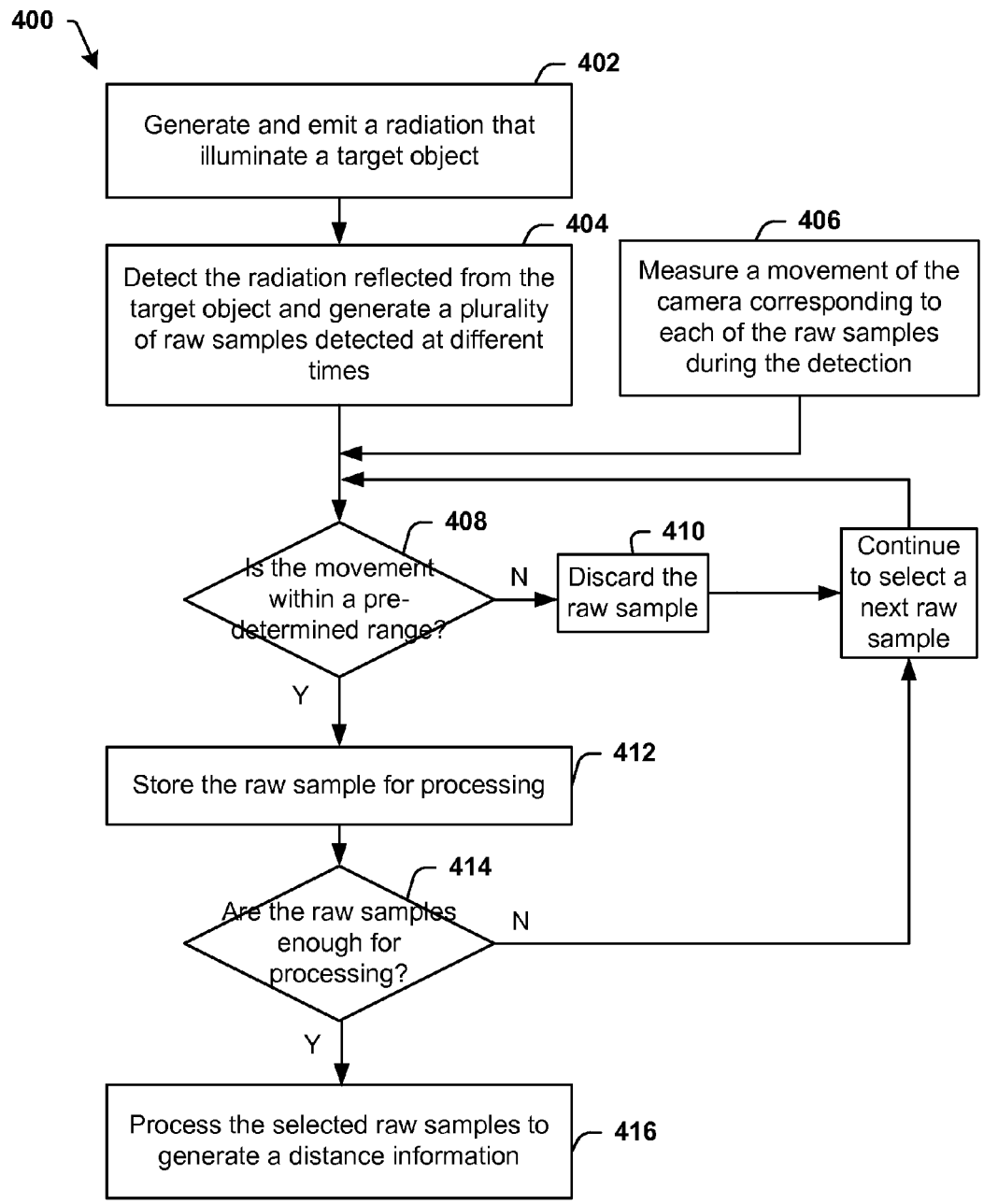
FIG. 4 is a flow diagram illustrating a method of operating a TOF camera according to some embodiments.

FIG. 4 is a flow diagram illustrating a method 400 of operating a TOF camera according to some embodiments. The above systems and components can be referenced to facilitate understanding of the method 400. Further, the method 400 can be at least partially incorporated by the above systems and/or components.

The method 400 generates a distance information of a target object relative to a TOF camera by processing at least two selected raw samples of a radiation that strikes a target object and is reflected back to the TOF camera. The processed raw samples that are used in the analysis are detected in succession and have corresponding movement signal portions that are within a pre-determined threshold value, thus indicating data samples where the TOF camera is substantially at the same position.

The method 400 begins at block 402, wherein a radiation is generated and emitted from a radiation source and strikes a target object.

At 404, the radiation is reflected from the target object and detected. A sample set with a plurality of raw samples is detected in succession at different times. Shown at 406, a movement signal is detected meanwhile indicating movements of the camera when detecting the sample set. Each raw sample has a corresponding movement signal portion.

At 408, a first movement signal portion corresponding to a first raw sample is evaluated. If the first movement signal portion exceeds a pre-determined range of movement, the corresponding first raw sample is discarded at 410 and a second movement signal portion corresponding to a second raw sample is evaluated at 408 again. If the first movement signal portion is within a pre-determined range of movement, the first raw sample is stored at 412 for a later processing.

At 414, a determination is made whether an amount of the stored raw samples are enough for processing. As in the example above, four raw samples are needed for the processing. If not, a next raw sample is evaluated at 408 again. After enough raw samples are acquired (Yes at 414), the selected raw samples are processed to generate the distance information at 416.

Figure 5:
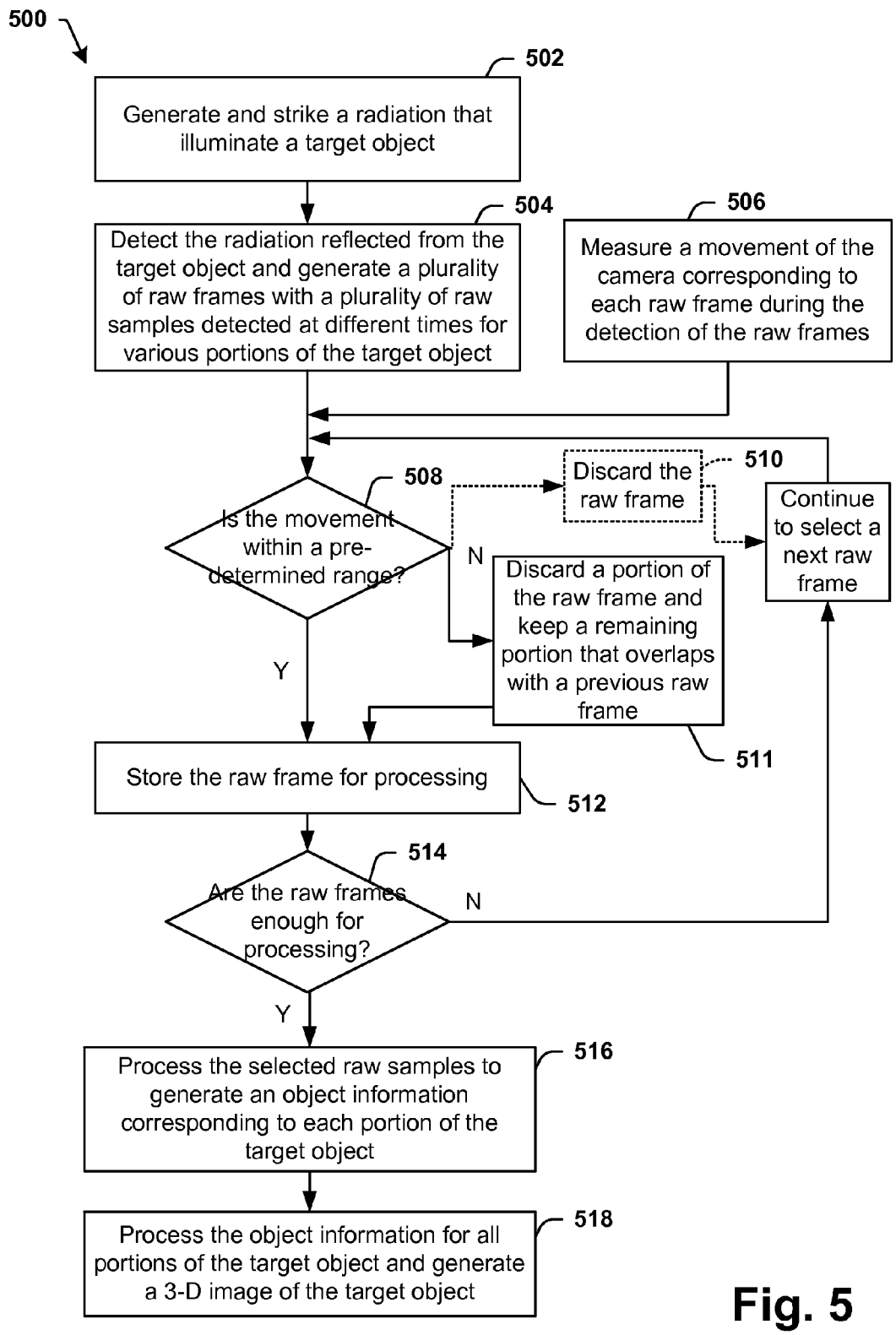
FIG. 5 is a flow diagram illustrating a method of operating a TOF camera according to some other embodiments.

FIG. 5 is a flow diagram illustrating a method 500 of operating a TOF camera according to some other embodiments. The above systems and components can be referenced to facilitate understanding of the method 500. Further, the method 500 can be at least partially incorporated by the above systems and/or components.

The method 500 generates a 3D image of a target object. An object information for various portions of the target object is generated separately first and then combined as a 3D image of the target object.

The method 500 begins at block 502, wherein a radiation is generated and emitted from a radiation source and strikes a target object.

At 504, the radiation is reflected from the target object and detected. A plurality of raw frames with a plurality of raw samples is detected in succession at different times. The raw frames comprise sample sets corresponding to different portions of the target object. Shown at 506, a movement signal is also detected indicating movements of the camera corresponding to the raw frames. Thus each raw frame has a corresponding movement signal portion.

At 508, a first movement signal portion corresponding to a first raw frame is evaluated. If the first movement signal portion exceeds a pre-determined range of movement (e.g., with respect to a reference position or a previous position), in some embodiments, the corresponding first raw frame can be discarded at 510 and a second movement signal portion corresponding to a second raw frame is evaluated at 508 again. Alternatively, in some embodiments, the first raw frame can be further processed. For example, a portion of the first raw frame can be discarded while a remaining portion of the first raw frame can be kept at 511. The kept portion of the first raw frame comprises raw samples that overlap with some other raw samples of another raw frame. The overlapped raw samples can be from different pixels of the detector but a relative location of the pixels to the corresponding portion of the target object when the raw samples detected should be substantially not moved. The new first raw frame with the remaining kept portion only is then stored for further processing at 512. If the first movement signal portion is within a pre-determined range (Yes at 508), the first raw sample is also stored at 512 for a later processing.

At 514, a determination is made whether an amount of the stored raw frames are enough for processing. If not, a next raw frame is evaluated at 508 again. After enough raw frames are acquired, the selected raw frames are processed to generate the object information for each portion of the target object separately at 516. Then at 518, the object information for all portions of the target object are processed to generate a 3D image for the target object.

It is appreciated that the above methods and variations thereof can be combined and utilized interchangeably. The claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of system that may be used to implement methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A time-of-flight (TOF) camera system includes a radiation source, a radiation detector, a location sensor system and a processor. The radiation source is configured to generate and emit a radiation that strikes a target object. The radiation detector is configured to detect the radiation reflected from the target object and generate a sample set comprising at least two raw samples detected in succession at different times based on the reflected radiation. The location sensor system is configured to detect movements of the TOF camera during the detection and generate a movement signal having portions thereof uniquely corresponding to each of the raw samples of the sample set based on the movements of the TOF camera, wherein a portion of the movement signal is detected at a same time of generating the corresponding raw sample. The processor is configured to receive the raw samples and the corresponding movement signal portions and generate an object information based on the raw samples and the corresponding movement signal portion.

A time-of-flight (TOF) camera system includes a radiation source, a radiation detector, a location sensor system and a processor. The radiation source is configured to generate and emit a radiation that strikes a target object. The radiation detector comprising a pixel array is configured to detect the radiation reflected from corresponding portions of the target object, the pixel array detecting a frame set with a plurality of raw frames detected in succession at different times, wherein one portion of the target object corresponds to one sample set with a plurality of raw samples. The location sensor system is configured to detect movements of the TOF camera during the radiation detection and generate a corresponding movement signal comprising portions thereof uniquely corresponding to each of the raw samples of the sample set, each portion of the movement signal detected at a same time the corresponding raw sample is detected. The processor is configured to receive the sample set and select at least two raw samples from the sample set based on the corresponding portions of the movement signal, and further configured to generate an object information for the corresponding portion of the target object based on the selected raw samples. The processor is further configured to process the object information for the various portions of the target object and generate a three-dimension image of the target object based thereon.

A three-dimension imaging method utilizes a time-of-flight (TOF) camera. In the method, a radiation is generated and emitted that strikes a target object. The radiation is reflected from the target object and detected generating a sample set having a plurality of raw samples detected at different times for a corresponding portion of the target object. A movement information of the camera is then measured having portions of the movement information corresponding to each of the raw samples measured at the same time the raw sample was detected. At least two raw samples are selected from the sample set for the corresponding portion of the target object wherein the corresponding portions of the movement information for the selected at least two raw samples are within a pre-determined threshold. The selected raw samples are processed to generate an object information corresponding to the target object portion. At last, the object information for multiple portions of the target object is processed and a 3-D image of the target object is generated.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A time-of-flight (TOF) camera system, comprising:
    a radiation source configured to generate and emit a radiation that strikes a target object;
    a radiation detector configured to detect the radiation reflected from the target object and generate a sample set comprising raw samples detected at corresponding sampling times, the raw samples including a first raw sample and a second raw sample detected in succession during a first sampling time and a second sampling time, respectively, based on the reflected radiation;
    a location sensor system configured to detect movements of the TOF camera system without using the raw samples of the sample set during the detection and generate a movement signal having portions corresponding to sampling times of the raw samples of the sample set based on the movements of the TOF camera system, wherein a first portion and a second portion of the movement signal corresponds to the first sampling time and the second sampling time, respectively; and
    a processor configured to receive the raw samples and the corresponding movement signal portions and generate three dimensional (3D) image information for the target object based on processing of the raw samples with the corresponding movement signal portions;
    wherein the processor is configured to keep the first raw sample and selectively discard the second raw sample of the sample set; wherein selectively discarding of the second raw sample is based on whether the second portion of the movement signal exceeds a pre-determined threshold movement value, and selectively discarding of the second raw sample is independent of the raw samples of the sample set.

2. The TOF camera system of claim 1, wherein the 3D image information comprises a distance information between the TOF camera system and the target object or a reflection intensity information of the target object.

3. The TOF camera system of claim 1, wherein the location sensor system comprises an accelerometer, gyroscope, inclinometer, magnetometer, electronic compass, Global Position System (GPS) or combinations thereof.

4. The TOF camera system of claim 1, wherein the radiation detector further comprises a pixel array configured to detect the radiation reflected from different portions of the target object, a pixel of the pixel array generating a corresponding sample set comprising raw samples detected in succession at different times, wherein the corresponding sample set are processed together with the portions of the movement signal corresponding to each raw sample of the sample set to generate the 3D image information of a corresponding portion of the target object.

5. The TOF camera system of claim 1, wherein the processor comprises a reference signal synchronized with the emitted radiation from the radiation source.

6. The TOF camera system of claim 4, wherein the processor further processes the object information of the different portions of the target object and generate the 3D image of the target object.

7. The TOF camera system of claim 1, wherein the radiation is a visible spectrum, ultraviolet, infrared, x-ray, terahertz, microwave or radio radiation.

8. The TOF camera system of claim 1, wherein the radiation detector comprises a Photon Mixing Device (PMD).

9. A time-of-flight (TOF) camera system, comprising:
    a radiation source configured to generate and emit a radiation that strikes a target object;
    a radiation detector comprising a pixel array configured to detect the radiation reflected from corresponding portions of the target object, the pixel array detecting a frame set with a plurality of raw frames detected in succession at different sampling times, wherein one portion of the target object corresponds to one sample set with a plurality of raw samples which are spread over the plurality of raw frames;

a location sensor system configured to detect movements of the TOF camera system without using the raw samples of the sample set during the radiation detection and generate a corresponding movement signal comprising portions corresponding to each of the raw samples of the sample set, wherein a first portion and a second portion of the movement signal are generated at a first sampling time and a second sampling time, respectively, and a first raw sample and a second raw sample are generated at the first sampling time and the second sampling time, respectively; and a processor configured to receive the sample set and select at least two raw samples from the sample set based on the corresponding portions of the movement signal, and further configured to generate an object information for the corresponding portion of the target object based on the selected raw samples, the processor further configured to process the object information for the various portions of the target object and generate a three-dimensional image of the target object based on processing of the selected raw samples with the corresponding portions of the movement signal;

wherein the processor is further configured to discard some raw samples of a raw frame corresponding to some portions of the target object while keeping some other raw samples of the raw frame corresponding to some other portions of the target object if a corresponding portion of the movement signal exceeds a pre-determined threshold movement value; wherein the kept raw samples overlap with some raw samples of another raw frame detected previously corresponding to the same portions of the target object.

10. The TOF camera system of claim 9, wherein the raw samples correspond to distance information regarding the target object, and wherein the distance information is generated based on a phase shift of the reflected radiation to the emitted radiation, the phase shift acquired from comparing at least four raw samples detected at different sampling times and selected from the sample set with a reference signal having at least four different pre-set delays with respect to the emitted radiation.

11. The TOF camera system of claim 9, wherein the raw samples are selected from the sample set such that the corresponding portions of the movement signal are within a pre-determined threshold.

12. The TOF camera system of claim 9, wherein the movement signal comprises a location or rotation information of the TOF camera system.

13. The TOF camera system of claim 1, wherein whether to discard a raw sample is determined based on the corresponding portion of the movement signal prior to processing remaining raw samples of the sample set.

14. A time-of-flight (TOF) camera system for determining three dimensional (3D) image information regarding a target object, the TOF camera system comprising:

a pixel array comprising a first pixel and a second pixel which are arranged at different locations within the pixel array, the first pixel configured to detect a first raw sample corresponding to a first portion of the target object at a first sampling time, and the second pixel configured to detect a second raw sample corresponding to the first portion of the target object at a second sampling time, the second sampling time differing from the first sampling time;

a location sensor system configured to generate a movement signal which tracks movement of the TOF camera system in time without use of the pixel array, the movement signal comprising a first movement signal portion corresponding to the first sampling time and a second movement signal portion corresponding to the second sampling time; and a processor configured to determine the 3D image information for the target object based on the first raw sample and selectively based on the second raw sample, wherein the 3D image information is based on the second raw sample only when the second movement signal portion does not exceed a pre-determined threshold movement value;

wherein the processor is configured to selectively discard the second raw sample from inclusion in the 3D image information based on whether the second movement signal portion exceeds the pre-determined threshold movement value and independent of raw samples from the pixel array.

15. A time-of-flight (TOF) camera system for determining three dimensional (3D) image information regarding a target object, the TOF camera system comprising:

a pixel array comprising a first pixel and a second pixel which are arranged at different locations within the pixel array, the first pixel configured to detect a first raw sample corresponding to a first portion of the target object at a first sampling time, and the second pixel configured to detect a second raw sample corresponding to the first portion of the target object at a second sampling time, the second sampling time differing from the first sampling time;

a location sensor system configured to generate a movement signal which tracks movement of the TOF camera system in time without use of the pixel array, the movement signal comprising a first movement signal portion corresponding to the first sampling time and a second movement signal portion corresponding to the second sampling time; and a processor configured to determine the 3D image information for the target object based on the first raw sample and selectively based on the second raw sample, wherein the 3D image information is based on the second raw sample only when the second movement signal portion does not exceed a pre-determined threshold movement value;

wherein the processor is configured to retain the first raw sample and the second raw sample in a first frame and a second frame in that the first raw sample and the second raw sample each corresponds to the first portion of the target object in the first frame and the second frame, and is configured to discard non-overlapping raw samples from the first frame and the second frame.

16. The TOF camera system of claim 15, wherein the non-overlapping raw samples are non-overlapping in that each non-overlapping raw sample in the first frame relates to a corresponding portion of the target object in the first frame and does not have an analogous non-overlapping raw sample corresponding to the corresponding portion of the target object in the second frame, and vice versa.

17. A time-of-flight (TOF) camera system for determining three dimensional (3D) image information regarding a target object, the TOF camera system comprising:

a pixel array comprising a first pixel and a second pixel which are arranged at different locations within the pixel array, the first pixel configured to detect a first raw sample corresponding to a first portion of the target object at a first sampling time, and the second pixel configured to detect a second raw sample corresponding to the first portion of the target object at a second sampling time, the second sampling time differing from the first sampling time;

a location sensor system configured to generate a movement signal which tracks movement of the TOF camera system in time without use of the pixel array, the movement signal comprising a first movement signal portion corresponding to the first sampling time and a second movement signal portion corresponding to the second sampling time; and a processor configured to determine the 3D image information for the target object based on the first raw sample and selectively based on the second raw sample, wherein the 3D image information is based on the second raw sample only when the second movement signal portion does not exceed a pre-determined threshold movement value;

wherein the 3D image information is based on the first raw sample but not the second raw sample when the second movement signal portion exceeds the pre-determined threshold movement value, and wherein the 3D image information is based on both the first raw sample and the second raw sample only when the second movement signal portion does not exceed the pre-determined threshold movement value.

* * * * *